(12) United States Patent
Juretzek et al.

(10) Patent No.: US 10,570,827 B2
(45) Date of Patent: Feb. 25, 2020

(54) GAS TURBINE TRAIN WITH STARTER MOTOR

(71) Applicant: Siemens Aktiengesellschaft, Munich (DE)

(72) Inventors: Uwe Juretzek, Erlangen (DE); Matthias Baca, Lünen (DE); Rüdiger Jansen, Nürnberg (DE); Meinolf Klocke, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/063,750

(22) PCT Filed: Jan. 19, 2017

(86) PCT No.: PCT/EP2017/051056
§ 371 (c)(1),
(2) Date: Jun. 19, 2018

(87) PCT Pub. No.: WO2017/137227
PCT Pub. Date: Aug. 17, 2017

(65) Prior Publication Data
US 2019/0153957 A1  May 23, 2019

(30) Foreign Application Priority Data
Feb. 12, 2016  (DE) .................. 10 2016 202 156

(51) Int. Cl.
*F02C 7/268*  (2006.01)
*F01D 15/10*  (2006.01)
(Continued)

(52) U.S. Cl.
CPC .............. *F02C 7/268* (2013.01); *F01D 15/10* (2013.01); *H02K 7/108* (2013.01); *H02K 7/118* (2013.01);
(Continued)

(58) Field of Classification Search
CPC ......... F02C 7/268; F01D 15/10; H02K 7/108; H02K 7/118; H02K 7/1823; H02K 9/16; H02K 17/165; F05D 2220/76
See application file for complete search history.

(56) References Cited

U.S. PATENT DOCUMENTS 2,298,309 A * 10/1942 Ray ..................... B61C 9/14
105/61.5
2,547,660 A * 4/1951 Prince ..................... F02C 7/26
60/788

(Continued)

FOREIGN PATENT DOCUMENTS

DE   1909063 A1   1/1971
DE    808052    *  2/1971
(Continued)

OTHER PUBLICATIONS

International Search Report dated Mar. 27, 2017, for PCT/EP2017/051056.

*Primary Examiner* — Tulsidas C Patel
*Assistant Examiner* — Joseph Ortega
(74) *Attorney, Agent, or Firm* — Beusse Wolter Sanks & Maire

(57) ABSTRACT

A power plant and method for operating a power plant having a gas turbine and a generator which are arranged on a section, a shaft which connects the gas turbine to the generator in order to transmit a force, and a clutch which is arranged in the shaft between the gas turbine and the generator such that the shaft includes at least two sub-shafts, a first sub-shaft between the generator and the clutch and a second sub-shaft, which is referred to as a gas turbine intermediate shaft, between the gas turbine and the clutch. An electric motor is arranged in the section between the clutch and the gas turbine in order to accelerate the gas turbine.

10 Claims, 3 Drawing Sheets

(51) Int. Cl.
    *H02K 17/16*     (2006.01)
    *H02K 7/108*     (2006.01)
    *H02K 7/118*     (2006.01)
    *H02K 7/18*     (2006.01)
    *H02K 9/16*     (2006.01)

(52) U.S. Cl.
    CPC ............ *H02K 7/1823* (2013.01); *H02K 9/16* (2013.01); *H02K 17/165* (2013.01); *F05D 2220/76* (2013.01)

(56) References Cited

U.S. PATENT DOCUMENTS

| | | | | |
|---|---|---|---|---|
| 2,617,253 | A * | 11/1952 | Fusner | F02C 7/26 60/39.091 |
| 4,785,213 | A * | 11/1988 | Satake | H02K 16/00 310/114 |
| 5,148,668 | A * | 9/1992 | Frutschi | F01K 3/02 60/39.182 |
| 5,386,687 | A * | 2/1995 | Frutschi | F02C 7/185 60/774 |
| 5,737,912 | A * | 4/1998 | Krakowitzer | F01K 23/103 60/39.182 |
| 6,691,531 | B1 * | 2/2004 | Martinez | F25J 1/0282 62/612 |
| 8,689,583 | B2 * | 4/2014 | Kolscheid | F01D 15/08 62/612 |
| 8,938,966 | B2 * | 1/2015 | Jockenhoevel | F01D 15/00 60/39.12 |
| 9,939,194 | B2 * | 4/2018 | McCarthy | F25J 1/0284 |
| 2002/0077512 | A1 * | 6/2002 | Tendick | C01B 3/34 568/959 |
| 2003/0182944 | A1 * | 10/2003 | Hoffman | F01K 23/10 60/772 |
| 2005/0200336 | A1 * | 9/2005 | Drubel | F02C 7/268 322/59 |
| 2006/0138881 | A1 * | 6/2006 | Nakahara | F01D 15/10 310/68 D |
| 2007/0199331 | A1 * | 8/2007 | Maguire | F02C 3/107 60/796 |
| 2008/0034756 | A1 * | 2/2008 | Spalte | F02C 6/16 60/641.3 |
| 2009/0260367 | A1 * | 10/2009 | Martin | F02C 6/06 60/778 |
| 2009/0302152 | A1 * | 12/2009 | Knight | B64D 41/00 244/58 |
| 2010/0013223 | A1 * | 1/2010 | Certain | B60L 50/16 290/31 |
| 2010/0032964 | A1 * | 2/2010 | Hoffmann | F01D 15/10 290/40 B |
| 2010/0083669 | A1 * | 4/2010 | Foster | F02C 6/18 60/802 |
| 2010/0164234 | A1 * | 7/2010 | Bowman | F02C 7/32 290/1 R |
| 2010/0219779 | A1 * | 9/2010 | Bradbrook | F02C 3/113 318/153 |
| 2010/0288571 | A1 * | 11/2010 | Dewis | B60K 3/04 180/165 |
| 2011/0018269 | A1 * | 1/2011 | Moser | F03D 7/0204 290/44 |
| 2011/0076136 | A1 * | 3/2011 | Small | F04D 25/026 415/124.2 |
| 2012/0104754 | A1 * | 5/2012 | Rudolf | F03D 7/0284 290/44 |
| 2012/0201657 | A1 * | 8/2012 | Donnelly | F02C 6/20 415/123 |
| 2012/0262024 | A1 * | 10/2012 | Kleynhans | H02K 15/0012 310/211 |
| 2013/0049364 | A1 * | 2/2013 | Teets | G08G 1/0129 290/45 |
| 2013/0133335 | A1 * | 5/2013 | Graf | F16H 47/085 60/801 |
| 2013/0139519 | A1 * | 6/2013 | Kesseli | F02C 9/26 60/773 |
| 2013/0149102 | A1 * | 6/2013 | Marcucci | F04D 17/10 415/1 |
| 2013/0192216 | A1 * | 8/2013 | Berlin, Jr. | F02C 6/16 60/327 |
| 2013/0284608 | A1 * | 10/2013 | Blake | F03D 1/0625 205/464 |
| 2013/0341934 | A1 * | 12/2013 | Kawanishi | B60L 8/00 290/1 A |
| 2014/0113828 | A1 * | 4/2014 | Gilbert | G01R 33/0354 505/100 |
| 2014/0250861 | A1 * | 9/2014 | Eames | F02C 9/44 60/204 |
| 2015/0128597 | A1 * | 5/2015 | Schlak | F03B 13/00 60/719 |
| 2015/0191250 | A1 * | 7/2015 | DeVita | B64C 27/12 701/3 |
| 2015/0244296 | A1 * | 8/2015 | Edwards | F02C 9/00 290/40 B |
| 2016/0036230 | A1 * | 2/2016 | Day | H02J 3/1885 307/127 |
| 2016/0097328 | A1 * | 4/2016 | Wintgens | F02C 7/32 415/1 |
| 2016/0105078 | A1 * | 4/2016 | Santini | F02C 7/36 290/52 |
| 2016/0177822 | A1 * | 6/2016 | Howes | F02C 6/16 60/785 |
| 2016/0265631 | A1 * | 9/2016 | Strashny | B63H 21/20 |
| 2016/0273456 | A1 * | 9/2016 | Zhang | F02C 7/22 |
| 2017/0082033 | A1 * | 3/2017 | Wu | F04D 25/02 |
| 2017/0089261 | A1 * | 3/2017 | Bourne | F01D 15/10 |
| 2018/0041092 | A1 * | 2/2018 | Ourion | H02K 1/185 |
| 2018/0298777 | A1 * | 10/2018 | Nguyen | H02J 7/00 |

FOREIGN PATENT DOCUMENTS

| | | | |
|---|---|---|---|
| DE | 2057035 A1 | 5/1972 | |
| DE | 4426354 C2 | 3/2003 | |
| DE | 102007007913 A1 | 8/2008 | |
| DE | 102015111394 A1 | 2/2016 | |
| EP | 2494156 B1 | 8/2013 | |
| GB | 1345740 A | 2/1974 | |
| JP | S58105750 A | 6/1983 | |
| JP | S58105750 U | 7/1983 | |
| JP | H01177422 A | 7/1989 | |
| JP | H0642369 A | 2/1994 | |
| JP | 2002350092 A | 12/2002 | |
| JP | 2004137933 * | 5/2004 | ............ F01D 15/10 |
| JP | 2004137933 A | 5/2004 | |
| JP | 2006503536 A | 1/2006 | |
| JP | 2006180644 A | 7/2006 | |
| JP | 2013122247 A | 6/2013 | |
| WO | 2005093248 A1 | 10/2005 | |

\* cited by examiner

GAS TURBINE TRAIN WITH STARTER MOTOR

CROSS REFERENCE TO RELATED APPLICATIONS

This application is the US National Stage of International Application No. PCT/EP2017/051056 filed Jan. 19, 2017, and claims the benefit thereof. The International Application claims the benefit of German Application No. DE 102016202156.7 filed Feb. 12, 2016. All of the applications are incorporated by reference herein in their entirety.

FIELD OF INVENTION

The invention relates to a power plant and also to a method for its operation during grid stabilization.

BACKGROUND OF INVENTION

Up to now, grid services, such as the provision of rotating mass and reactive power, have been managed virtually secondarily by large power plants, with large turbosets, being in operation. As a result of the preferred feed of electric current from photovoltaic power plants and wind power plants, which is pursued in certain countries, these power plants are squeezed out of the market or taken off the grid, at least for a time, and therefore these can no longer provide these grid services. Photovoltaic power plants and wind power plants, on account of their technical features, are able to provide no, or only little, reactive power, short circuit power and rotating mass for ensuring grid stability. This problem will be magnified still more in the future as the percentage of these renewable energies increases further.

Furthermore, owing to the lack of storage possibilities for the renewable electric current, the requirement also exists for a demand for an ensured fossil reserve, capable of quick starting, for when the demand for electric current cannot be covered via the renewable energies. This demand for real power and its quick change can preferably be covered via gas turbine power plants which are relatively favorable and quick to start, which power plants can be operated comparatively economically especially in the case of a low number of utilization hours. Their economic efficiency is further improved if these can provide the required grid services (reactive power and short circuit power and also fixedly coupled rotating masses) without real power having to be provided.

If it is to become possible for the gas turbine power plant to provide reactive power, etc., without real power being delivered to the grid at the same time, the generator which is synchronized with the grid has to be disconnected from the gas turbine via a clutch. In the case of gas turbine power plants which are based on large single-shaft, axial flow gas turbines this leads to the problem that the generator is then not available for a restarting process of the gas turbine (the generator is "converted" for this type of gas turbine with the aid of a starting converter for the starter motor), since, being synchronized with the grid, it is required as a rotating phase changer for grid stabilization while the gas turbine is kept in turning operation only at low rotational speed or, if necessary, is stationary (turning operation: turning of the rotor during the cooling down phase in order to avoid bowing of the hot rotor).

In previous designs, for starting a gas turbine power plant which is provided with a clutch between a large single-shaft, axial flow gas turbine and generator, the generator had to be disconnected from the grid and decelerated to the rotational speed of the gas turbine in order to be able to couple the generator and the gas turbine for the starting process with the result that the grid services had to be interrupted for a certain and possibly critical period.

Up to now, there have been no practical solutions for starting a large single-shaft, axial flow gas turbine which is independent of the generator (or of a separate starter motor connected on the generator side). Existing solutions for small gas turbines, which for example connect a starter motor to a transmission provided for the generator connection, are not provided for these gas turbines. Against the further possibility of greatly enlarging the existing hydraulic turning gear (e.g. on the basis of a Pelton wheel which is driven via lubricating oil provided from the high-pressure lift oil pump) of the large single-shaft, axial flow gas turbine and therefore also utilizing such for starting the gas turbine, is the plant-technical cost and the inefficiency of such a system, which in turn would correspondingly increase the power consumption during startup of the gas turbine and entail further costs (e.g. enlargement of a possibly existing black start diesel).

SUMMARY OF INVENTION

It is an object of the invention to provide a power plant which enables an improved level of grid stabilization. It is a further object of the invention to disclose a corresponding method for grid stabilization.

The invention achieves the object which is directed toward a power plant by it providing that in the case of such a power plant with a gas turbine and a generator, which are arranged in a train, a shaft which connects the gas turbine to the generator for power transmission, and also a clutch which is arranged in the shaft between gas turbine and generator so that the shaft comprises at least two shaft sections with a first shaft section between generator and clutch and a second shaft section, referred as a gas turbine intermediate shaft, between gas turbine and clutch, an electric motor for accelerating the gas turbine is arranged in the train between clutch and gas turbine.

Therefore, according to the invention an electric starter motor is positioned directly in the train between gas turbine and a clutch which is preferably constructed as a self-shifting and synchronizing clutch. The motor always co-rotates at the rotational speed of the gas turbine, regardless of whether it is supplied with electric current or not. It is in operation only during starting and, if necessary, during the cooling down phase (so-called turning operation) of the gas turbine (it is supplied during this period via a converter), otherwise it co-rotates only in "idling" mode.

By means of a starter motor arranged in such a way, a large single-shaft, axial flow gas turbine can be started independently of its associated generator.

This has the advantage that such a gas turbine can be started independently of the operating state of the generator, an interruption of the phase changer operation no longer being necessary. The synchronizing process of the gas turbine takes place automatically in this case via a self-shifting and synchronizing clutch as soon as the gas turbine has achieved the same rotational speed as the generator. The switching over to real power operation is therefore carried out without interruption.

Furthermore, this motor, which is positioned in the train, can also undertake the function of driving during turning operation of the gas turbine and replaces the hydraulic turning gear which was as a rule previously used for this.

Overall, the possibility is therefore created for the power plant operator—even during periods in which the fossil fired gas turbine power plant cannot deliver real power to the grid on account of the preference of renewable energies—of being able to provide interruption-free reactive power and rotating mass as grid service and therefore also without real power being delivered, and of generating a flow of income or of fulfilling required feed boundary conditions. For this purpose, the already existing power plant components or other infrastructure are also used during these periods. The additional investment for this is limited to a comparatively small sum chiefly for the starter motor and the self-shifting and synchronizing clutch.

The described concept can naturally also be used in other power plant types, especially in so-called gas and steam power plants, which are based on large single-shaft, axial flow gas turbines.

Compared with the otherwise conceivable possibility for realizing starting of the gas turbines via an electric starter motor, which is located at the side not directly in the train, via a transmission, etc., connected to the main shaft, the power plant according to the invention has the advantage that it manages with fewer components (therefore lower costs and higher availability) and has fewer losses.

The additional starter motor between generator and gas turbine therefore enables an extremely high flexible operation of a gas turbine-based power plant and therefore meets the future demands of internal grid codes. In addition to very quick provision of real power outputs depending on demand with high change gradients, reactive and short circuit power can become fully available independently of gas turbine operation and therefore increases the contribution to frequency stabilization by means of rotating masses. Therefore, the gas turbine power plant can be operated both as a real power generator and also as a rotating phase changer at any time point. Previous concepts do not allow a simultaneous operation.

In an advantageous embodiment of the invention, the motor is an asynchronous motor. These are robust and inexpensive. Other constructional forms, such as three-phase synchronous motors, are also conceivable.

Particularly advantageous in this case is an embodiment in which the motor undertakes the previous task and position of the gas turbine intermediate shaft; it is therefore integrated into the intermediate shaft to a certain extent. The intermediate shaft has the task of transmitting the power of the gas turbine through the intake duct, continuing in the direction of the clutch, and finally to the generator. The shaft in this case has always to be dimensioned so that it can transmit the total torque between the gas turbine and the generator both during rated operation and in the event of failure. The starter motor could in this case be designed as an asynchronous machine with a squirrel-cage solid rotor as the rotor, which would make the integration into the intermediate shaft relatively simple. Provision would only have to be made in the intermediate shaft for a rotor body which is offset from the rest of the intermediate shaft. Slots for the bars of the rotor cage would have to be milled into this. The associated copper bars are driven into the slots. At the face ends, bars and rotor body are connected by soldered on short circuit rings so that the intermediate shaft is designed at least partially as a squirrel-cage solid rotor.

In an advantageous embodiment, a rotating field stator encloses the intermediate shaft in the region of the rotor body and is constructed in a multiplicity of parts for better installation and removal.

Alternatively to the embodiment in which the motor undertakes the previous task and position of the gas turbine intermediate shaft, it can also be advantageous if the intermediate shaft and the motor are interconnected via flanges. This alternative configuration with a separate motor installed in the train (shaft of the motor and intermediate shaft are two components which are interconnected via flanges) in addition to the previous intermediate shaft or a modified (shortened) intermediate shaft is also possible.

In an advantageous embodiment of the invention, the gas turbine power plant also comprises an intake duct for air which is to be compressed in a compressor of the gas turbine, wherein the motor is arranged in the intake duct. The motor would therefore not require a separate housing and at the same time is cooled by means of the air which is inducted by the gas turbine compressor.

In an alternative embodiment of the invention, the motor is arranged outside the intake duct, which has the advantage that no intervention has to be made into the intake region of the gas turbine and therefore the integration into the previous standard is made easier.

In any case, the train length (in the case of the positioning of the starter motor on the intermediate shaft inside the intake duct) does not increase, or only slightly increases (in the case of the positioning of the starter motor on the intermediate shaft outside the intake duct). An additional "unusually thick" shaft for the motor does not have to be provided either.

The power plant according to the invention also comprises a converter which is connected to the generator in order to accelerate this for synchronization with the grid. In this case, it is expedient if the converter can be switched over to the motor so that this converter can also be used for supplying the motor.

The object which is directed toward a method is achieved by means of a method for operating a power plant during grid stabilization operation, the power plant comprising, arranged in a train, a gas turbine, a generator, a shaft which connects the gas turbine to the generator for power transmission, and also a clutch which is arranged in the shaft between gas turbine and generator, wherein in a first phase the generator is synchronized with a supply grid and is required as a rotating phase changer for grid stabilization while the gas turbine is kept in turning operation or is stationary, and is characterized in that in a second phase the generator remains synchronized with the grid and the gas turbine is started via a motor which is arranged in the train of the power plant.

In this case, it is expedient if in the case of a rotational speed of the gas turbine between firing rotational speed and synchronization rotational speed the motor is switched off and co-rotates in idling mode at the rotational speed of the gas turbine. The firing rotational speed is the rotational speed at which the fuel is fed to the gas turbine and ignited (usually at about 600 RPM. After the firing, the fuel mass flow is increased, in a first step up to synchronization rotational speed. The starter motor, also after the firing, still supports the further acceleration of the gas turbine rotor and is only switched off at about 2000 RPM. Only then is the supplied fuel quantity sufficient in order to provide acceleration up to synchronization rotational speed without motor support within a reasonable space of time.

BRIEF DESCRIPTION OF THE DRAWINGS

The invention is explained in more detail by way of example with reference to the drawings. In the drawings, schematically and not to scale.

DETAILED DESCRIPTION OF INVENTION

Figure 1:
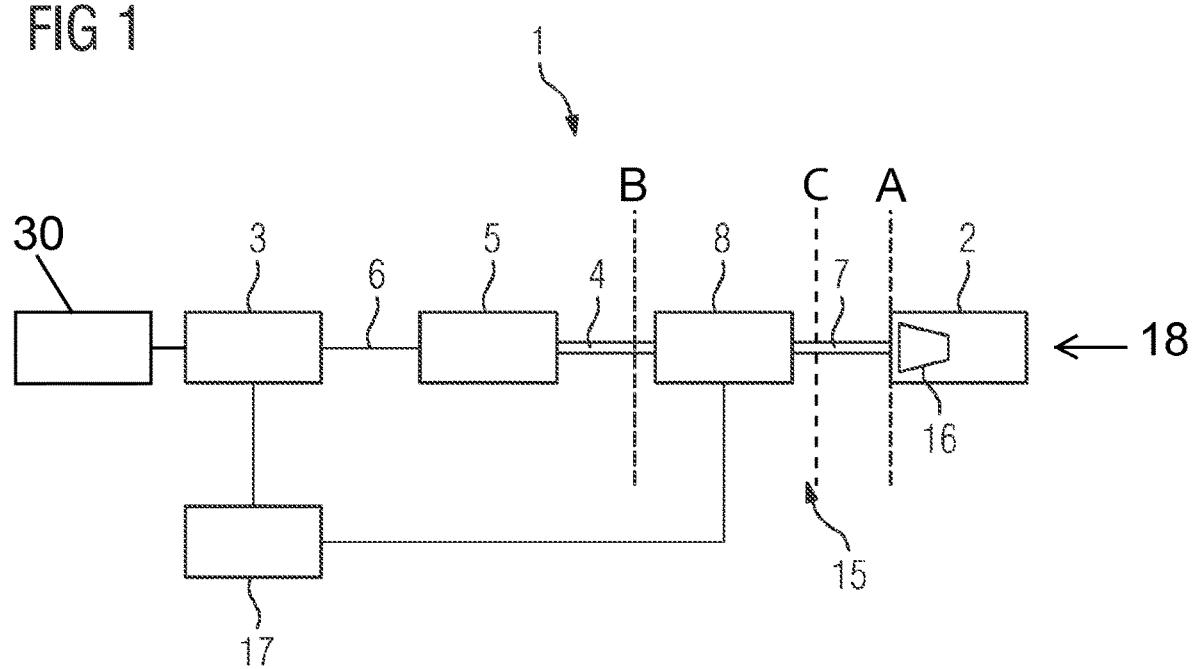
FIG. 1 shows the train of a power plant, especially a gas turbine plant with a starter motor, integrated into the intermediate shaft, for the gas turbine.

FIG. 1 shows, schematically and by way of example, a power plant 1 with a gas turbine 2 and a generator 3, arranged in a train 18. The generator is, in turn, connected to the grid 30. The gas turbine 2 is connected to the generator 3 for power transmission via a shaft 4 in which is arranged a clutch 5. As a result, the shaft comprises two shaft sections 6 and 7, with a first shaft section 6 between generator 3 and clutch 5 and a second shaft section 7, referred to as the gas turbine intermediate shaft 7, between gas turbine 2 and clutch 5. According to the invention, an electric motor 8 for accelerating the gas turbine 2 is arranged in the train 18. The electric starter motor 8 is positioned directly in the train 18 between gas turbine 2 and the clutch 5, which is advantageously constructed as a self-shifting and synchronizing clutch.

FIG. 1 shows an exemplary embodiment in which the motor 8 is arranged in the intake duct 15 as indicated by lines A and B for air which is to be compressed in a compressor 16 of the gas turbine 2. Alternatively, the motor 8 can also be arranged outside the intake duct 15 as indicated by lines A and C but still in the train 18.

FIG. 1 also shows that a converter 17, which is connected to a generator 3, can expediently also be switched over to the motor 8.

Figure 2:
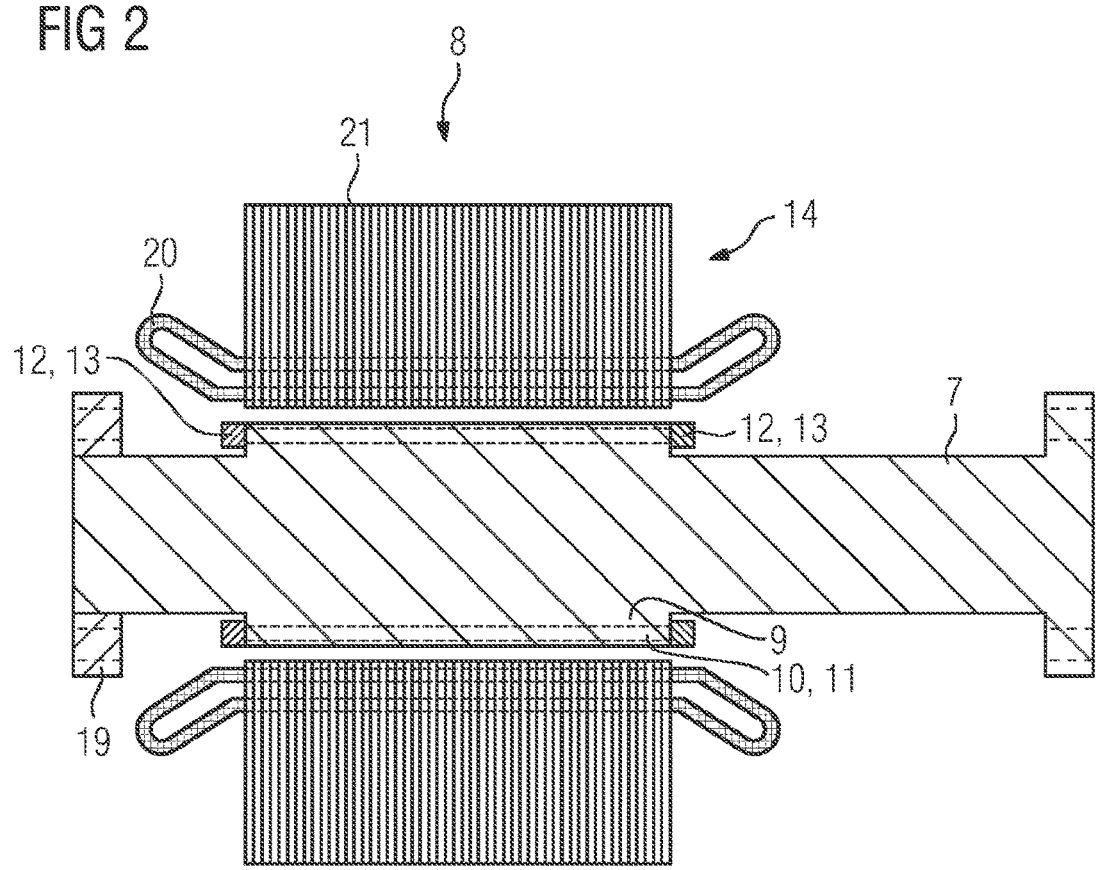
FIG. 2 shows a starter motor split open along the longitudinal axis.

FIG. 2 shows details relating to the motor 8 in longitudinal section. In the exemplary embodiment of FIG. 2, provision is made in the gas turbine intermediate shaft 7 for a rotor body 9. The rotor body 9 has slots 10 in which are arranged copper bars 11 which serve as rotor cage bars. These are connected at their face ends 12 to the rotor body 9 via short-circuit rings 13 so that the gas turbine intermediate shaft 7 is designed at least partially as a squirrel-cage solid rotor.

Figure 4A:
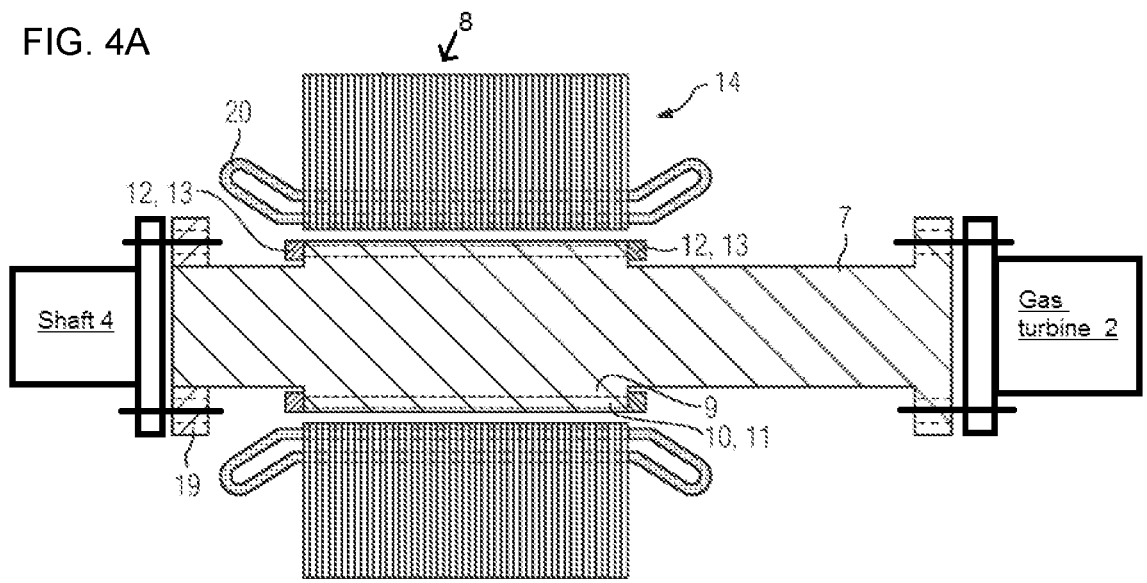
FIG. 4A shows an embodiment of an installation of the starter motor.
Figure 4B:
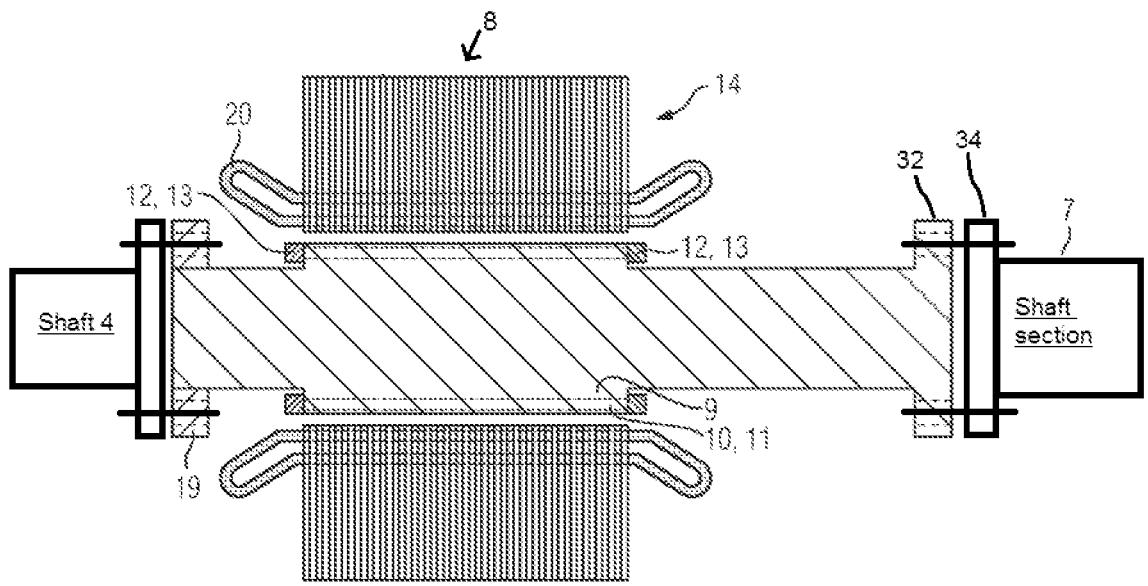
FIG. 4B shows an alternate embodiment of the installation of the starter motor.

FIG. 2 also shows a rotating-field stator 14 with a stator overhang winding 20 and also a rotating-field laminated core 21 which encloses the gas turbine intermediate shaft 7 in the region of the rotor body 9. FIG. 4A shows an embodiment in which the motor 8 undertakes the previous task and position of the gas turbine intermediate shaft 7; it is therefore integrated into the intermediate shaft 7 to a certain extent. Alternatively, FIG. 4B shows an embodiment where the intermediate shaft 7 and the motor 8 are interconnected via flanges 32, 34.

In the simplest case, the rotating-field stator 14 is constructed in one piece. The gas turbine intermediate shaft 7 and the motor 8 are then expediently interconnected via flanges. FIG. 2 shows a shrunk-on coupling 19 for this.

In an alternative embodiment, which is not shown, the rotating-field stator 14 is of a multipiece or separable construction for better installation and removal.

Figure 3:
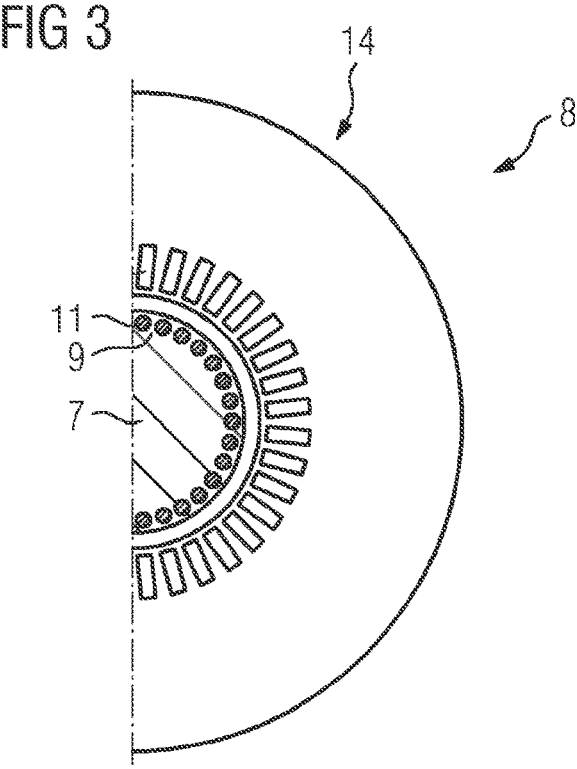
FIG. 3 shows a starter motor in cross section.

FIG. 3 shows the motor 8 from FIG. 2 in cross section with rotating-field stator 14, stator slot 23 and intermediate shaft 7 with rotor body 9 and copper bars 11 (=rotor bars).

The invention claimed is:

1. A power plant comprising:
a gas turbine and a generator which are arranged in a train,
a shaft which connects the gas turbine to the generator for power transmission,
a clutch which is arranged in the shaft between the gas turbine and the generator so that the shaft comprises at least two shaft sections, with a first shaft section between the generator and the clutch and a second shaft section, referred to as a gas turbine intermediate shaft, between the gas turbine and the clutch, and
an electric motor for accelerating the gas turbine which is arranged in the train between the clutch and the gas turbine and always co-rotates at a rotational speed of the gas turbine.

2. The power plant as claimed in claim 1, wherein the electric motor is an asynchronous motor.

3. The power plant as claimed in claim 1, further comprising:
a rotor body,
wherein provision is made in the gas turbine intermediate shaft for the rotor body and the rotor body has slots in which are arranged copper bars which at their face ends are connected to the rotor body via short-circuit rings so that the gas turbine intermediate shaft is designed at least partially as a squirrel-cage solid rotor.

4. The power plant as claimed in claim 3, wherein a rotating-field stator encloses the gas turbine intermediate shaft in a region of the rotor body and is of a multi-piece construction.

5. The power plant as claimed in claim 1, wherein the electric motor is interconnected into the train via flanges.

6. The power plant as claimed in claim 1, further comprising:
an intake duct for air which is to be compressed in a compressor of the gas turbine, wherein the electric motor is arranged in the intake duct.

7. The power plant as claimed in claim 1, further comprising:
an intake duct for air which is to be compressed in a compressor of the gas turbine, wherein the electric motor is arranged outside the intake duct.

8. The power plant as claimed in claim 1, further comprising:
a starting converter which is connected to the generator, wherein the starting converter switches over to the electric motor when required.

9. A method for operating a power plant during grid stabilization operation, the power plant comprising, arranged in a train, a gas turbine, a generator, a shaft which connects the gas turbine to the generator for power transmission, and also a clutch which is arranged in the shaft between the gas turbine and the generator, the method comprising:
in a first operating mode, the generator is synchronized with a power grid and is operated as a rotating phase changer for stabilization of the power grid while the gas turbine is kept in turning operation or is stationary, and
in a second operating mode, the generator remains synchronized with the power grid and the gas turbine is started via a motor which is arranged in the train of the power plant.

10. The method as claimed in claim 9,
wherein in the case of a rotational speed of the gas turbine between a firing rotational speed and a synchronization rotational speed the motor is switched off and co-rotates in idling mode at the rotational speed of the gas turbine.

\* \* \* \* \*